July 7, 1931.  W. J. TURKENTON  1,813,646
COMBINATION COOKING UTENSIL
Filed Jan. 7, 1931   3 Sheets-Sheet 1
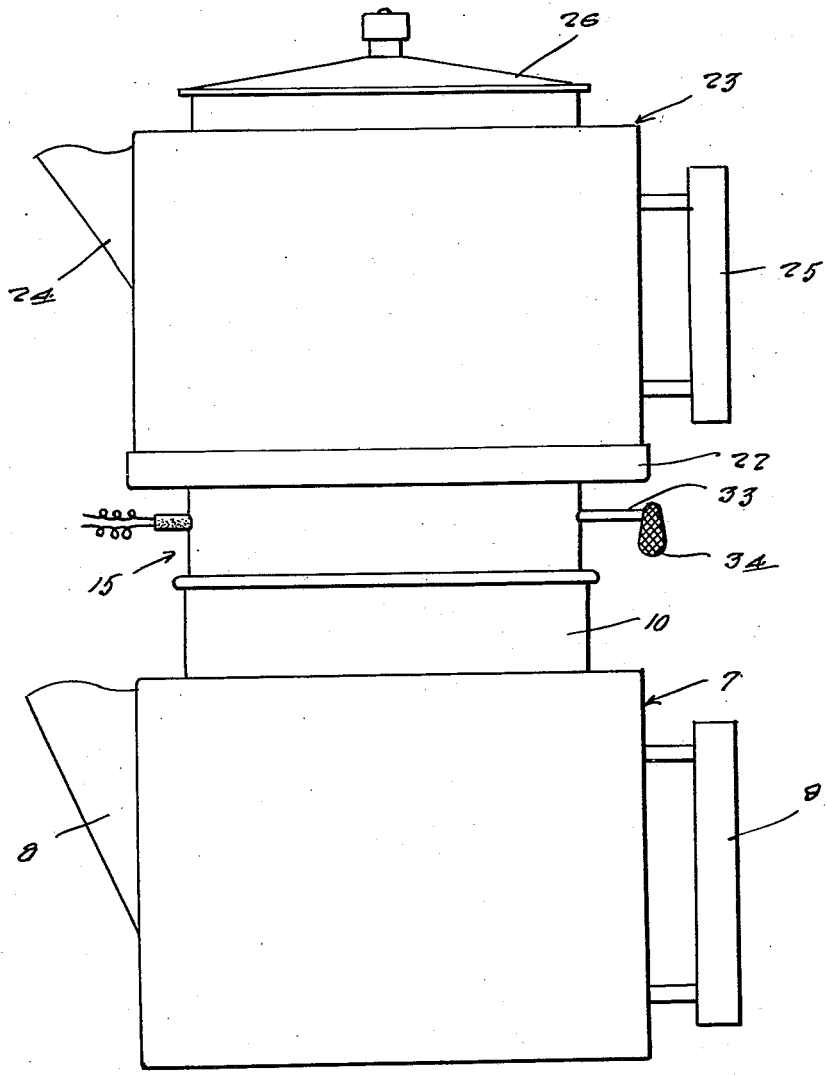
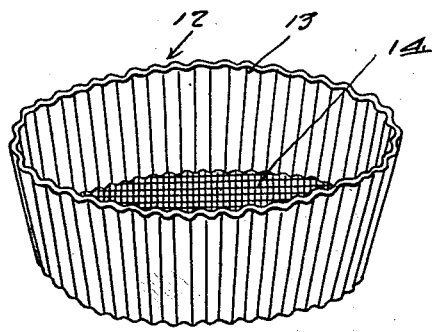
Inventor
W. J. Turkenton
By Clarence A. O'Brien
Attorney July 7, 1931.    W. J. TURKENTON    1,813,646
COMBINATION COOKING UTENSIL
Filed Jan. 7, 1931    3 Sheets-Sheet 2

Inventor
W. J. Turkenton

By Clarence A. O'Brien
Attorney

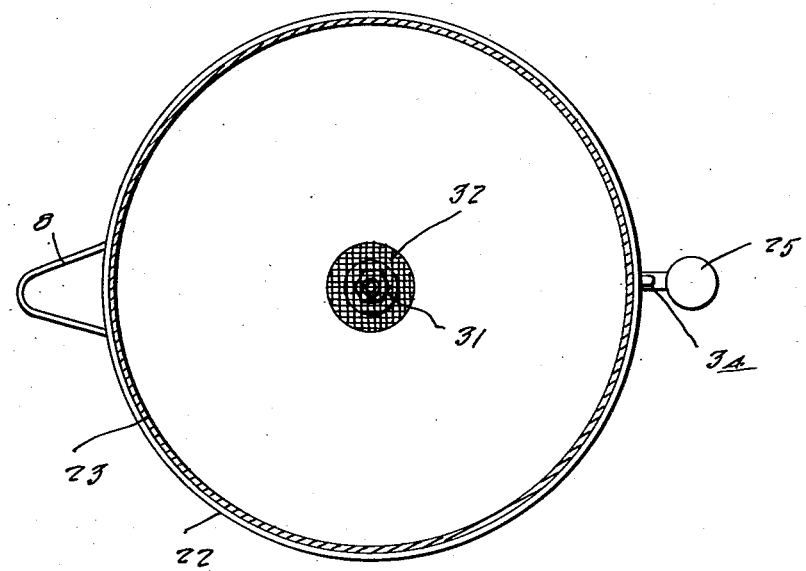
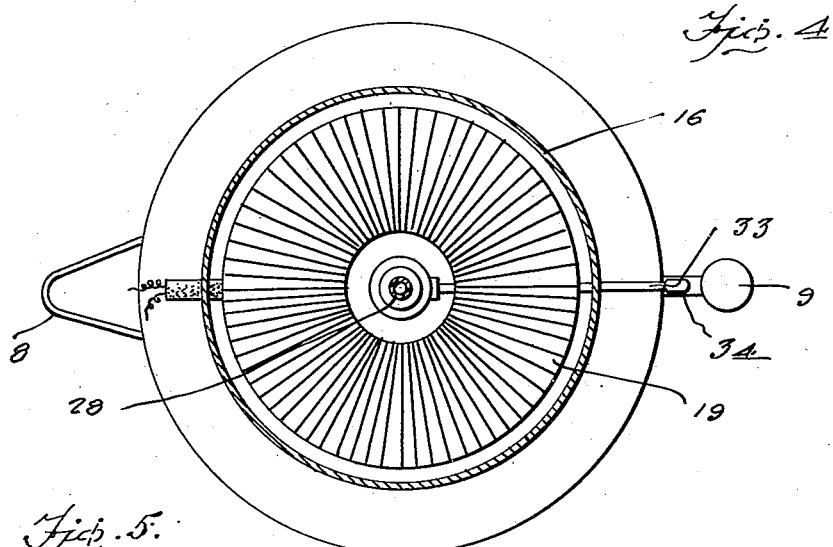
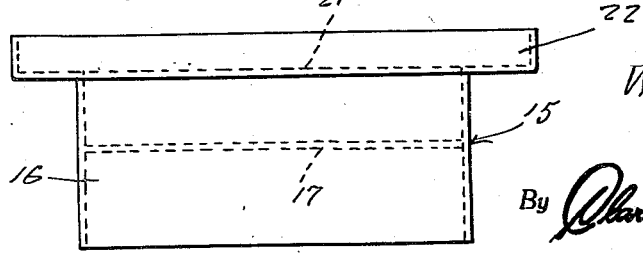

Patented July 7, 1931

1,813,646

UNITED STATES PATENT OFFICE

WILLIAM J. TURKENTON, OF LANCASTER, OHIO

COMBINATION COOKING UTENSIL

Application filed January 7, 1931. Serial No. 507,245.

This invention relates to an improved combination cooking utensil of a dual or duplex nature characterized by a self-contained electrical heater, and associated assembly of details for boiling water for general utility purposes, or to be utilized in the making of beverages, such as coffee, tea, and the like.

Briefly stated, this improved structural arrangement is individualized by a unique ensemble of parts including a liquid receiving and pouring receptacle, a vertically superposed liquid container and boiler, and an intervening especially designed housing constructed as a support for the boiler, and itself supported from a portion of said receptacle.

My primary aim is to provide a multiple part utensil of the aforesaid character which permits the incorporation therein of a strainer equipped coffee pan so located and arranged as to permit boiling water to impinge on the coffee, to permeate the coffee and to drip into the liquid coffee receiving and pouring receptacle.

A highly important feature of construction constituting a novel contribution to the art is the especially designed valved duct and associated fitting constituting the means of communication between the boiler and liquid receptacle, said duct including a distributing nozzle for spraying the hot water onto the granulated coffee in the underlying pan, whereby to permit the making of coffee in a distinctively new manner possessing a flavor free from harmful irritants and acids, to thus provide a more healthful and tasty beverage.

Other structural details and their relative arrangement and association therof will become more readily apparent from the following description and drawings.

In the drawings:

Figure 1 is a side elevational view of the complete assembly with the parts in co-operative relationship.

Figure 2:
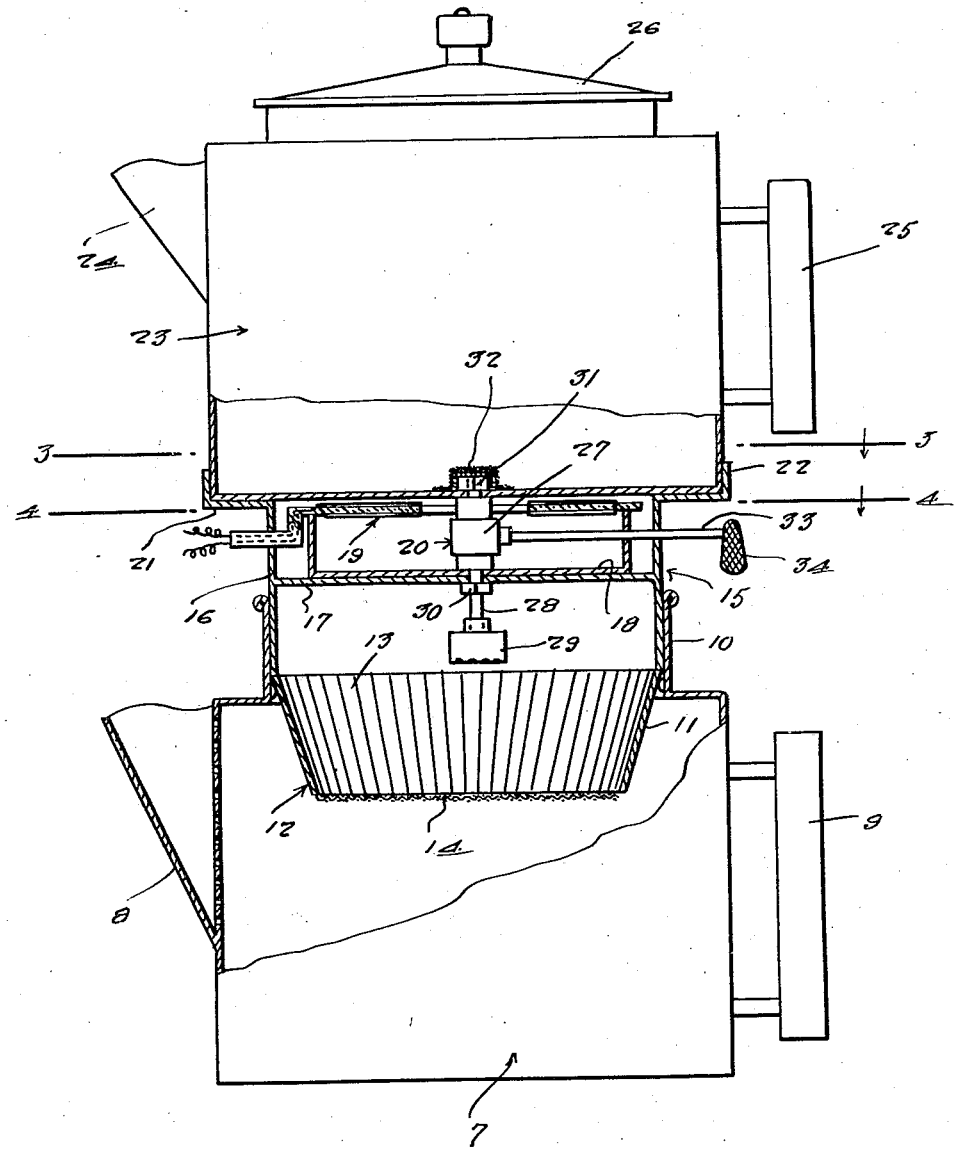
Figure 2 is a view like Figure 1 with portions broken away and shown in section to disclose the details in greater particularity.

Figures 3 and 4 are horizontal sections on the line 3—3 and 4—4 of Figure 2.

Figure 5 is a detail elevational view of the intermediate housing.

Figure 6 is a perspective view of the especially designed commodity containing pan.

In the drawings, in Figure 2 for example, the numeral 7 designates the beverage receiving storing and pouring receptacle. This is of hollow cylindrical form and provided on one side with a discharge spout 8 and on a diametrically opposite side with a handle 9. Rising from the open top is a slightly reduced annular neck 10 provided on its inner periphery with circumferentially spaced lugs 11 constituting rests to accommodate the removable pan 12. This pan includes a tapered corrugated rim 13 and a screen bottom 14. It rests on the lug 11 and depends into the upper portion of the receptacle 7.

The upper edge of this rim 13 provides a supporting ledge to accommodate the intermediate casing or housing 15. This part 15 comprises an annulus 16 having a central horizontal diaphragm or partition 17. The lower skirt portion below the partition depends telescopically into the neck 10 and seats itself on the rim 13.

The upper portion constitutes a compartment to accommodate a cup-like element 18. This part 18 constitutes a base to accommodate a suitable electric heater generally designated by the numeral 19. It will be observed that the electrical heater is of ring-like configuration and surrounds the especially designed conduit generally designated by the numeral 20.

The numeral 21 designates an outstanding horizontal flange, 22 indicating an upstanding marginal retaining flange. These flanges 21 and 22 co-operate in forming a seat for the water boiler and container 23. This part 23 is similar in shape and design to the receptacle 7, being provided on one side with a spout 24, and on the opposite side with the handle 25. The numeral 26 merely designates a removable cover or lid carried by the neck portion of the boiler.

The aforesaid conduit 20 is of a composite construction and constitutes a means not only for conducting the boiling water from the container 23 into the receptacle 7 but also as a coupling device for attaching the parts 15 and 23 together to form a bodily removable unit.

The central portion of the conduit embodies a casing 27 having a suitable internal valve (not shown) and depending from this casing is a water delivery pipe 28. This extends down through the opening in the parts 17 and 18 and is provided on its lower end with a distributing spray head or nozzle 29. The numeral 30 designates a retaining nut.

Incidently, the nozzle 29 terminates on a plane above the pan 12. The upper reduced and shouldered end portion of this conduit extends through an opening in the bottom of the boiler 23 where it is connected with a retention nut 31. Over this end and nut is a filtering screen 32. The valve handle 33 is formed on its outer end with a suitable finger piece 34 for convenient operation.

It is obvious that the parts 15 and 23 are connected together through the medium of this special fitting or conduit 20 form a single unit characterized by a self-contained electrical heater and confining housing as well as a water boiler. As before stated, the annulus 16 telescopes into the neck 10 and rests on the upper edge portion of the pan or coffee basket 12.

This basket 12 is removable by itself to facilitate filling and dumping. With this arrangement it is obvious that the self-contained heater section of the structure can be employed by itself for heating water for general utility purposes.

In practice, it is obvious that the details are assembled as shown in Figure 2 for making coffee or tea. In the first place, the basket or pan 12 is filled or partly filled with granulated coffee and then set in the neck 10 to rest on the lugs 11. It thus depends partially into the liquid collecting and pouring receptacle 7.

Then the upper part of the structure is fitted into place and the boiler 23 is filled with water. The heater is turned on and the water is allowed to come to a boil after which the valve is opened and the water allowed to flow by gravity down through the special conduit so that it will be sprayed by the coffee in the basket.

The water will percolate through the coffee and drip into the receptacle 7 for subsequent usage and pouring. As before stated, the self-contained heater and valve and spray device including the boiler and housing for the heater forms a single unit which can be employed by itself for heating water for general household purposes.

It is submitted that this spray method of making coffee is superior to other methods now in use. Many of the so-called drip coffee makers pass the water in small drops onto the finely ground coffee and in the process of dripping, the water looses the correct temperature required to extract the aromatic oils from the coffee, thus leaving many of the goods oils and flavors in the coffee grounds to be thrown out and wasted.

The spray method as incorporated in this improved structure, not only delivers the water at the correct temperature to the ground coffee in the basket below, but delivers it in jets or sprays which permeate every portion of the coffee deposited in the basket at the correct temperature. This takes the full strength out of the coffee and eliminates it as nearly as possible all of the tannic acid and bitterness which so many of the present coffeemakers in use today fail to do.

It is thought that the description taken in connection with the drawings will enable a clear understanding of the invention to be had. Therefore, a more lengthy description is thought unnecessary.

While the preferred embodiment of the invention has been shown and described, it is to be understood that minor changes in shape, size, and arrangement of parts, coming within the field of invention claimed may be resorted to if desired.

I claim:

In a structural assembly of the class described, a housing comprising an annulus formed with a central horizontal partition defining upper and lower compartments, the upper portion of said annulus being provided with an outstanding circular flange and an upstanding companion flange, said flanges constituting a seat, a water boiler arranged in said seat and having its bottom portion spanning the upper portion of said annulus, electrical heating means contained in the upper compartment of said housing, a casing in said upper compartment for supporting the electrical means, a conduit connected to and having communication with the central portion of the bottom of said boiler, a valve in said conduit, and operating means for said conduit, said conduit also including a reduced delivery pipe extending down through an opening in said partition, and through the bottom of the casing, a nut on the delivery pipe contacting the lower face of the partition with a part of the valve contacting the bottom of the casing and said casing resting on the attached partition and a distributing nozzle on the lower end of said pipe.

In testimony whereof I affix my signature.

WILLIAM J. TURKENTON.